(12) United States Patent
Kuniba

(10) Patent No.: US 7,924,288 B2
(45) Date of Patent: Apr. 12, 2011

(54) IMAGE PROCESSING DEVICE EMPHASIZING ON TEXTURE, IMAGE PROCESSING PROGRAM, ELECTRONIC CAMERA, AND IMAGE PROCESSING METHOD

(75) Inventor: Hideyasu Kuniba, Tokyo (JP)

(73) Assignee: Nikon Corporation, Tokyo (JP)

(*) Notice: Subject to any disclaimer, the term of this patent is extended or adjusted under 35 U.S.C. 154(b) by 345 days.

(21) Appl. No.: 11/629,794

(22) PCT Filed: Jun. 21, 2005

(86) PCT No.: PCT/JP2005/011327
§ 371 (c)(1),
(2), (4) Date: Dec. 15, 2006

(87) PCT Pub. No.: WO2005/125179
PCT Pub. Date: Dec. 29, 2005

(65) Prior Publication Data
US 2007/0252845 A1 Nov. 1, 2007

(30) Foreign Application Priority Data
Jun. 22, 2004 (JP) ................. 2004-184208

(51) Int. Cl.
G09G 5/00 (2006.01)
G06K 9/40 (2006.01)
(52) U.S. Cl. .................. 345/582; 382/264
(58) Field of Classification Search .......... 345/582–588; 382/264
See application file for complete search history.

(56) References Cited

U.S. PATENT DOCUMENTS

| | | | |
|---|---|---|---|
| 5,757,976 A * | 5/1998 | Shu | 382/252 |
| 5,760,843 A | 6/1998 | Morimura et al. | |
| 6,266,102 B1 | 7/2001 | Azuma et al. | |
| 6,373,992 B1 * | 4/2002 | Nagao | 382/266 |
| 6,667,815 B1 | 12/2003 | Nagao | |
| 6,895,124 B1 * | 5/2005 | Kira et al. | 382/260 |
| 7,016,549 B1 | 3/2006 | Utagawa | |
| 7,778,478 B2 | 8/2010 | Kuniba | |
| 2002/0114513 A1 * | 8/2002 | Hirao | 382/167 |
| 2003/0053689 A1 * | 3/2003 | Watanabe et al. | 382/167 |
| 2003/0153519 A1 | 8/2003 | Kay et al. | |
| 2004/0081366 A1 | 4/2004 | Monobe et al. | |
| 2005/0207641 A1 | 9/2005 | Bala et al. | |
| 2007/0165282 A1 | 7/2007 | Sambongi et al. | |

FOREIGN PATENT DOCUMENTS

| | | |
|---|---|---|
| JP | A 2-36675 | 2/1990 |
| JP | A-5-76034 | 3/1993 |
| JP | A-6351036 | 12/1994 |
| JP | A 7-170428 | 7/1995 |

(Continued)

OTHER PUBLICATIONS

Office Action issued Feb. 3, 2011 in U.S. Appl. No. 12/216,883.

*Primary Examiner* — Aaron M Richer
(74) *Attorney, Agent, or Firm* — Oliff & Berridge, PLC (57) ABSTRACT

An image processing device extracts a local variation component from color information in image data. Using the variation component of the color information, a pseudo-texture component of brightness information is produced. The thus produced pseudo-texture component is added to the brightness information. By this image processing, an image having improved texture is produced.

7 Claims, 3 Drawing Sheets

FOREIGN PATENT DOCUMENTS

| JP | A 9-154044 | 6/1997 |
| JP | A 10-210324 | 8/1998 |
| JP | A-2001-61157 | 3/2001 |
| JP | A 2001-118064 | 4/2001 |
| JP | A 2001-245178 | 9/2001 |
| JP | A 2002-44678 | 2/2002 |
| JP | A 2002-290772 | 10/2002 |
| JP | A-2005-167896 | 6/2005 |

* cited by examiner

IMAGE PROCESSING DEVICE EMPHASIZING ON TEXTURE, IMAGE PROCESSING PROGRAM, ELECTRONIC CAMERA, AND IMAGE PROCESSING METHOD

CROSS-REFERENCE TO RELATED APPLICATION

This application is a U.S. nationalization of International Application PCT/JP2005/011327, filed Jun. 21, 2005, designating the U.S., and claims the benefit of priority from Japanese Patent Application No. 2004-184208, filed on Jun. 22, 2004, the entire contents of which are incorporated herein by reference.

TECHNICAL FIELD

The present invention relates to an image processing technique to emphasize texture of an object in an image.

BACKGROUND ART

In the prior art, with an electronic camera set to a high sensitivity (for example, by raising the output gain of an image pickup device), a shot image will have an increase in noise such as coarse noises, and show color speckles. Such noises can be reduced by smoothing the image. However, excessive smoothing damages a fine image structure of an object, so that the image will not have good texture.

There is a known device that compensates for such deterioration in texture as shown in the following patent document 1.

According to the patent document 1, a minute amplitude component is extracted from image data to add the minute amplitude component to the image data. This prior art technique enables texture emphasis, so-called "wrinkle emphasis".

Patent document 1: Japanese Unexamined Patent Application Publication No. 2001-118064 (for example, FIG. 5)

DISCLOSURE OF THE INVENTION

Problems to be Solved by the Invention

However, in the prior art technique according to the patent document 1, even minute amplitude components that should be removed as a noise is directly added to the image data. This causes a problem that the surface of an object shows coarseness or color speckle noise due to the noise.

In view of solving the above problem, an object of the present invention is to provide an image processing technique to emphasize the texture of an image while preventing an increase in noise level.

<<1>>

The image processing device of the present invention performs image processing to image data including brightness information and color information, and it includes a variation extraction part, a conversion part, and an addition part to be described below.

The variation extraction part extracts a local variation component from color information in image data.

The conversion part produces a pseudo-texture component of brightness information from a variation component of the color information.

The addition part adds the produced texture component to the brightness information.

<<2>>

Preferably, the variation extraction part includes a smoothing part and a difference part. The smoothing part performs smoothing of image data and extracts a smoothed component. On the other hand, the difference part obtains a local variation component from a difference between the image data and the smoothed component. In this case, the conversion part produces the texture component by modulating the variation component in accordance with the value of the smoothed component.

<<3>>

Preferably, the conversion part produces a texture component by modulating the variation component in accordance with a random number value.

<<4>>

Preferably, the conversion part produces a pseudo-texture component of the brightness information by modulating a variation component of color information in accordance with the brightness information.

<<5>>

Preferably, the variation extraction part includes a first smoothing part, a second smoothing part, and a difference part.

The first smoothing part smoothes a spatial frequency band with a high visual sensitivity.

The second smoothing part smoothes a noise band.

The difference part obtains a difference in the spatial frequency band between before and after the smoothing by the first smoothing part to produce a variation component.

The addition part adds the produced texture component to the output of the second smoothing part.

<<6>>

The electronic camera of the present invention includes the image processing device according to any one of the above-mentioned <<1>> to <<5>> and an image pickup part that shoots an object to produce image data. In this case, the image data produced by the image pickup part is processed in the image processing device.

<<7>>

The image processing program of the present invention causes a computer to function as the variation extraction part, the conversion part, and the addition part according to any one of the above-mentioned <<1>> to <<5>>.

<<8>>

The image processing method of the present invention performs image processing to image data including brightness information and color information and executes the following operational steps:

the variation extraction step of extracting a local variation component from color information in image data;

the conversion step of producing a pseudo-texture component of the brightness information from the variation component of the color information; and the addition step of adding the produced texture component to the brightness information.

Advantageous Effect of the Invention

In the present invention, first, a local variation component is extracted from color information in image data. The variation component includes essential detailed information to determine a representation of texture of an image. A pseudo-texture component of brightness information is produced by using the variation component of the color information as a detail material. The pseudo-texture component thus produced from the color information is added to the brightness information. Such processing makes it possible to reflect the variation of color information in the texture component of brightness information and to enrich the texture representation of brightness information.

Preferably, in accordance with the brightness given from the brightness information, the pseudo-texture component produced from the color information is increasingly/decreasingly modulated. This processing makes it possible to increase the amount of the pseudo-texture components to be added in the gradation band in which noises are inconspicuous, and to reduce the amount of pseudo-texture components to be added in the gradation band in which noises are conspicuous. In this case, it is made possible to produce an image with less noise but abundant in texture.

Preferably, the pseudo-texture component produced from the color information is increasingly/decreasingly modulated in accordance with a signal level of the color information. This processing makes it possible to increase the amount of pseudo-texture components to be added in the low saturation band in which texture is inconspicuous and to reduce the amount of pseudo-texture components in the high saturation band in which noises are conspicuous. In this case, it is made possible to produce an image with less color noise but abundant in texture.

Preferably, the variation component of the color information is modulated with a random number. This processing makes it possible to diffuse the frequency component of the variation component (or, to convert it into one in the high band). In this case, the texture included in the variation component of the color information varies randomly and finely so that it is made possible to add to an output image a change in texture with small particles similar to the actual object. Further, this modulation with a random number makes it possible to diffuse the frequency of noises concentrated in the low band (so-called color speckles) and included in the variation component of the color information. As a result, the pseudo-texture component becomes free from the noises concentrated in the low band such as speckle patterns and it can be turned into one with small particles. In this case, it is possible to produce an image with less conspicuous noises such as speckle patterns and abundant in texture.

The above-described objects and other objects of the present invention can be seen easily from the following description and accompanied drawings.

BRIEF DESCRIPTION OF THE DRAWINGS

The nature, principal, and utility of the invention will become more apparent from the following detailed description when read in conjunction with the accompanying drawings in which like parts are designated by identical reference numbers, in which.

BEST MODES FOR CARRYING OUT THE INVENTION

First Embodiment

Figure 1:
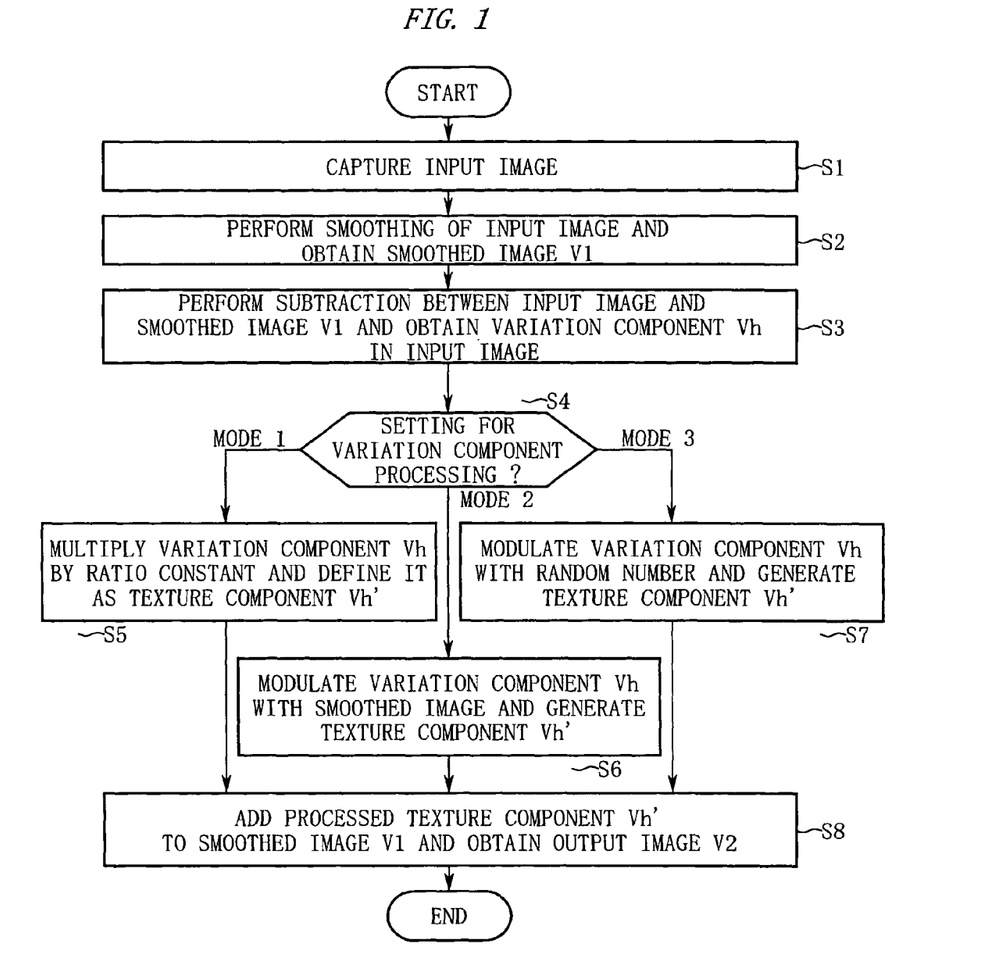
FIG. 1 is a flow diagram for explaining the operation of a first embodiment.

FIG. 1 is a flow diagram for explaining an image processing program in a first embodiment.

The following will describe operation of a computer according to the first embodiment in order of step numbers shown in FIG. 1.

Step S1:
The computer captures an input image Vo to be processed.

Step S2:
The computer performs smoothing of the input image Vo in accordance with the following expression to obtain a smoothed image V1.

[Expression 1]

$$V1(x, y) = \frac{\sum_{x'=x-R}^{x+R} \sum_{y'=y-R}^{y+R} W(Vo(x', y') - (Vo(x, y)) \cdot Vo(x', y')}{\sum_{x'=x-R}^{x+R} \sum_{y'=y-R}^{y+R} W(Vo(x', y') - Vo(x, y))} \quad [1]$$

where $$W(d) \equiv \exp\left(-\frac{d^2}{\sigma^2}\right)$$

In the expression, (x, y) and (x', y') are coordinates representing the pixel position of the image. Further, σ in the expression is a value that determines an amplitude range in which smoothing is performed strongly and it is preferable to set σ to the order of the noise amplitude or the amplitude of the detail component. Furthermore, R in the expression is a value that determines the radius of smoothing and it is preferable to set R to the order of the noise radius or detail radius. The weighting function W(d) may not be the same as the above expression, however, is preferably a monotonically decreasing function of pixel difference |d|. For example, $W(d)=1/(d^2/\sigma^2+1)$ may be accepted.

Step S3:
Next, the computer performs subtraction between the input image Vo and the smoothed image V1 to obtain a variation component Vh in the input image Vo.

$$Vh=Vo(x,y)-V1(x,y) \quad [2]$$

Step S4:
Here, the computer branches the operation in accordance with processing modes 1 to 3 of the variation component Vh custom-set in advance by a user.

First, in the mode 1, the computer shifts the operation to step S5.

Further, in the mode 2, the computer shifts the operation to step S6.

Furthermore, in the mode 3, the computer shifts the operation to step S7.

Step S5:
In mode 1, the computer multiplies the variation component Vh by a proportionality constant k less than one to produce a texture component Vh'.

$$Vh'(x,y)=k\cdot Vh(x,y) \quad [3]$$

After this processing the computer shifts the operation to step S8.

Step S6
In mode 2, using the following expression, the computer performs modulation processing of the variation component Vh in accordance with the global-band brightness indicated by the smoothed image V1.

[Expression 2]

$$Vh'(x, y) = t(V1(x, y))Vh(x, y) \quad [4]$$

where $$t(v) \equiv \begin{cases} 0.5 & v < v\max/2 \\ (v\max - v)/2 & v \geq v\max/2 \end{cases}$$

In the expression, Vmax is an upper limit value of the pixel value and set to, for example, 255.

After this processing, the computer shifts the operation to step S8.

Step S7:

In mode 3, the computer multiplies the variation component Vh by a random number S in the interval [0, 1] or the interval [−1, 1] to obtain the texture component Vh'.

$$Vh'(x,y) = S \cdot Vh(x,y) \quad [5]$$

As the random number S, a random number such as, for example, a white noise, or a random number such as 1/f noise may be accepted.

After this processing, the computer shifts the operation to step S8.

Step S8:

In accordance with the following expression, the computer adds the processed texture component Vh' to the smoothed image V1 to obtain an output image V2.

$$V2(x,y) = V1(x,y) + Vh'(x,y) \quad [6]$$

Effects of the First Embodiment Etc.

The effects exerted by the first embodiment will be described below.

In mode 2 described above, in the area in which the smoothed image V1 is dark, the variation component is amplitude-modulated on a large scale. As a result, it is made possible to emphasize the texture in the dark area in which texture is inconspicuous and to obtain the output image V2 abundant in texture.

Further, in mode 2, in the medium-bright and bright areas in which noises are conspicuous, the variation component is amplitude-modulated on a small scale. Consequently, it is possible to obtain the output image V2 in which noises are inconspicuous.

On the other hand, in mode 3 described above, the variation component is modulated with a random number. As a result, it is possible to frequency-diffuse the spatial frequency of the variation component. In this case, the texture included in the variation component varies randomly and it is possible to add to the output image V2 the texture varied randomly as that of the actual object varies.

In mode 3, modulating the noise included in the variation component with a random number frequency-diffuses the spatial frequency component of the noise in the broad band. Normally, the noise conspicuous with an impression of coarseness is produced by the noise biased to a specific spatial frequency band. Consequently, frequency-diffusing the noise using mode 3 solves the concentration of noise into the specific spatial frequency band and makes it possible to turn the noise into an inconspicuous noise with small particles.

Furthermore, adding the texture component Vh' modulated with a random number to the image data makes it possible to obtain a kind of dither effect. This dither effect also makes it possible to raise the level of gradation of the output image V2 properly.

In particular, modulating with the 1/f noise makes it possible to modulate the unnatural noise biased to the specific spatial frequency into the frequency fluctuation that often occurs in the natural environment. As a result, it is made possible to convert the unnatural and conspicuous noise into a more natural (for example, similar to particles of a silver-salt film) noise. Further, adding the natural dither effect to the image data allows the gradation of the output image V2 to approach more natural gradation.

Next, another embodiment will be described.

Second Embodiment

Figure 2:
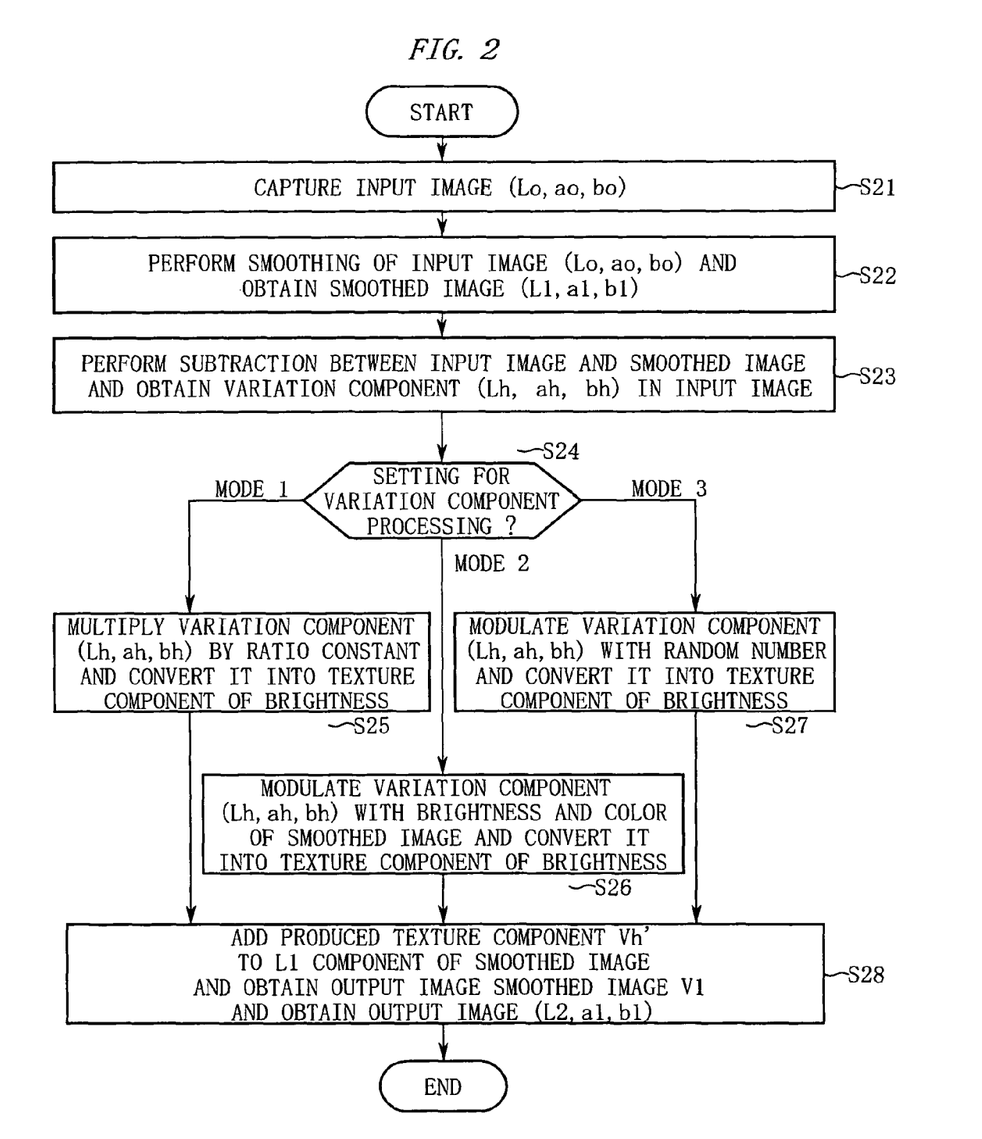
FIG. 2 is a flow diagram for explaining the operation of a second embodiment.

FIG. 2 is a flow diagram for explaining an image processing program in a second embodiment.

The operation of the second embodiment by a computer will be described below in order of step numbers shown in FIG. 2.

Step S21:

The computer captures an input image to be processed to obtain brightness information Lo and color information ao and bo of the input image.

Step S22:

The computer performs smoothing of the input image (Lo, ao, bo) in accordance with the following expression to obtain a smoothed image (L1, a1, b1).

[Expression 3]

$$\begin{cases} L1(x, y) = \dfrac{\sum\limits_{x'=x-R}^{x+R} \sum\limits_{y'=y-R}^{y+R} W(Lo(x', y') - Lo(x, y), ao(x', y') - ao(x, y), bo(x', y') - bo(x, y)) \cdot Lo(x', y')}{\sum\limits_{x'=x-R}^{x+R} \sum\limits_{y'=y-R}^{y+R} W(Lo(x', y') - Lo(x, y), ao(x', y') - ao(x, y), bo(x', y') - bo(x, y))} \\[2ex] a1(x, y) = \dfrac{\sum\limits_{x'=x-R}^{x+R} \sum\limits_{y'=y-R}^{y+R} W(Lo(x', y') - Lo(x, y), ao(x', y') - ao(x, y), bo(x', y') - bo(x, y)) \cdot ao(x', y')}{\sum\limits_{x'=x-R}^{x+R} \sum\limits_{y'=y-R}^{y+R} W(Lo(x', y') - Lo(x, y), ao(x', y') - ao(x, y), bo(x', y') - bo(x, y))} \\[2ex] b1(x, y) = \dfrac{\sum\limits_{x'=x-R}^{x+R} \sum\limits_{y'=y-R}^{y+R} W(Lo(x', y') - Lo(x, y), ao(x', y') - ao(x, y), bo(x', y') - bo(x, y)) \cdot bo(x', y')}{\sum\limits_{x'=x-R}^{x+R} \sum\limits_{y'=y-R}^{y+R} W(Lo(x', y') - Lo(x, y), ao(x', y') - ao(x, y), bo(x', y') - bo(x, y))} \end{cases} \quad [7]$$

where $$W(d1, d2, d3) \equiv \exp\left(-\dfrac{|d1| + |d2| + |d3|}{\sigma}\right) \quad [8]$$

It may also be possible to execute the expression [9] and the expression [11] stepwise instead of the above-mentioned expression [7]. In the expression [9] and the expression [11], smoothing is performed in two stages of the horizontal direction and the vertical direction of the screen.

[Expression 4]

$$\begin{cases} Ls(x,y) = \dfrac{\sum\limits_{x'=x-R}^{x+R} Wx(Lo(x',y)-Lo(x,y), ao(x',y)-ao(x,y), bo(x',y)-bo(x,y)) \cdot Lo(x',y)}{\sum\limits_{x'=x-R}^{x+R} Wx(Lo(x',y)-Lo(x,y), ao(x',y)-ao(x,y), bo(x',y)-bo(x,y))} \\[2em] as(x,y) = \dfrac{\sum\limits_{x'=x-R}^{x+R} Wx(Lo(x',y)-Lo(x,y), ao(x',y)-ao(x,y), bo(x',y)-bo(x,y)) \cdot ao(x',y)}{\sum\limits_{x'=x-R}^{x+R} Wx(Lo(x',y)-Lo(x,y), ao(x',y)-ao(x,y), bo(x',y)-bo(x,y))} \\[2em] bs(x,y) = \dfrac{\sum\limits_{x'=x-R}^{x+R} Wx(Lo(x',y)-Lo(x,y), ao(x',y)-ao(x,y), bo(x',y)-bo(x,y)) \cdot bo(x',y)}{\sum\limits_{x'=x-R}^{x+R} Wx(Lo(x',y)-Lo(x,y), ao(x',y)-ao(x,y), bo(x',y)-bo(x,y))} \end{cases}$$ [9]

where $$Wx(d1, d2, d3) \equiv \exp\left(-\dfrac{|d1|+|d2|+|d3|}{\sigma_x}\right)$$ [10]

[Expression 5]

$$\begin{cases} L1(x,y) = \dfrac{\sum\limits_{y'=y-R}^{y+R} Wy(Ls(x,y')-Ls(x,y), as(x,y')-as(x,y), bs(x,y')-bs(x,y)) \cdot Ls(x,y')}{\sum\limits_{y'=y-R}^{y+R} Wy(Ls(x,y')-Ls(x,y), as(x,y')-as(x,y), bs(x,y')-bs(x,y))} \\[2em] a1(x,y) = \dfrac{\sum\limits_{y'=y-R}^{y+R} Wy(Ls(x,y')-Ls(x,y), as(x,y')-as(x,y), bs(x,y')-bs(x,y)) \cdot as(x,y')}{\sum\limits_{y'=y-R}^{y+R} Wy(Ls(x,y')-Ls(x,y), as(x,y')-as(x,y), bs(x,y')-bs(x,y))} \\[2em] b1(x,y) = \dfrac{\sum\limits_{y'=y-R}^{y+R} Wy(Ls(x,y')-Ls(x,y), as(x,y')-as(x,y), bs(x,y')-bs(x,y)) \cdot bs(x,y')}{\sum\limits_{y'=y-R}^{y+R} Wy(Ls(x,y')-Ls(x,y), as(x,y')-as(x,y), bs(x,y')-bs(x,y))} \end{cases}$$ [11]

where $$Wy(d1, d2, d3) \equiv \exp\left(-\dfrac{|d1|+|d2|+|d3|}{\sigma_y}\right)$$ [12]

and $$\sigma_x \geq \sigma_y$$ [13]

Here, $\sigma$, $\sigma_x$, and $\sigma_y$ in these expressions are values that determine an amplitude range in which smoothing is performed strongly and are preferably set to the order of the noise amplitude or the amplitude of the detail component. Further, R in the expressions is a value that determines the radius of smoothing and is preferably set to the order of the noise radius or detail radius.

The weighting functions W, Wx, and Wy may not be the same as the above expressions, however, are preferably a monotonically decreasing function of pixel difference |d|. For example, a monotonically decreasing function of the following expression may be used as the weighting functions W, Wx, and Wy.

[Expression 6]

$$W(d1, d2, d3) \equiv \dfrac{1}{\left(\dfrac{d1^2+d2^2+d3^2}{\sigma^2}+1\right)}$$ [14]

It is preferable to change the values of the parameters in these expressions by taking into consideration the visual influence for the channel of each component.

Step S23:

Next, the computer performs subtraction between an input image (Lo, ao, bo) and a smoothed image (L1, a1, b1) to obtain a variation component (Lh, ah, bh) in the input image (Lo, ao, bo).

$$Lh(x,y)=Lo(x,y)-L1(x,y)$$

$$ah(x,y)=ao(x,y)-a1(x,y)$$

$$bh(x,y)=bo(x,y)-b1(x,y)$$

Step S24:

Here, the computer branches the operation in accordance with processing modes 1 to 3 of the variation component (Lh, ah, bh) custom-set in advance by a user.

First, in the mode 1, the computer shifts the operation to step S25.

Further, in the mode 2, the computer shifts the operation to step S26.

Furthermore, in the mode 3, the computer shifts the operation to step S27.

Step S25:

In mode 1, by weighted-adding the variation component Lh of the brightness information and the variation components ah and bh of the color information with weighted ratios (kl, ka, kb), the computer produces a pseudo-texture component Vh' of the brightness information.

$$Vh'(x,y)=k1 \cdot Lh(x,y)+ka \cdot ah(x,y)+kb \cdot bh(x,y)$$ [16]

For example, it is preferable to set the weighted ratios in the expression to kl=ka=kb=0.5.

Further, for example, it may also be possible to individually determine the weighted ratios as follows.

kl=0.35 ka=0.1 kb=0.05

It is only required for the weighted ratios ka, kb of the color information to be determined by taking into consideration the visual influence of the variation components ah and bh of the color information on the brightness (texture, in particular) and specifically, it is preferable to determine after being subjected to a subjective test of the image quality.

After this processing, the computer shifts the operation to step S28.

Step S26:

In this mode 2, using the following expression, the computer performs modulation processing of the variation component Lh of the brightness information and the variation components ah and bh of the color information in accordance with the global-band brightness indicated by the brightness information L1.

[Expression 7]

$$Vh'(x, y) = t(L1(x, y))(Lh(x, y) + ah(x, y) + bh(x, y)) \quad [17]$$

where $$t(L) \equiv \begin{cases} 1 & L \geq 0.75L\max \\ (L\max - L)/(0.25L\max) & L < 0.75L\max \end{cases}$$

In the expression, Lmax is an upper limit value of the brightness information L and is set to, for example, 255.

It may also be possible to modulate the variation components ah and bh of the color information using the color information a1 and b1 as shown by the following expression.

[Expression 8]

$$Vh'(x, y) = t(L1(x, y))Lh(x, y) + tc(a1(x, y), b1(x, y)) \quad [18]$$
$$(ah(x, y) + bh(x, y))$$

where $$tc(a, b) \equiv \begin{cases} 1 & |a| + |b| \geq (a\max + b\max)/4 \\ 4(|a| + |b|)/(a\max + b\max) & |a| + |b| < (a\max + b\max)/4 \end{cases}$$

In the expression, amax and bmax are upper limit values of the color information a1 and b1.

In this manner, after producing the pseudo-texture component Vh' of the brightness information, the computer shifts the operation to step S28.

Step S27:

In this mode 3, the computer multiplies the variation component Lh of the brightness information and the variation components ah and bh of the color information by random numbers S1 to S3 in the interval [0, 1] or the interval [−1, 1], respectively, to produce the pseudo-texture component Vh' of the brightness information.

$$Vh'(x,y) = S1 \cdot Lh(x,y) + S2 \cdot ah(x,y) + S3 \cdot bh(x,y) \quad [19]$$

As the random numbers S1 to S3, for example, a random number such as a white noise may be acceptable, or a random number such as a 1/f noise may also be acceptable.

After this processing, the computer shifts the operation to step S28.

Step S28:

In accordance with the following expression, the computer adds the processed texture component Vh' to the brightness information L1 of the smoothed image to obtain an output image (L2, a1, b1).

$$L2(x,y) = L1(x,y) + Vh'(x,y) \quad [20]$$

Effects of the Second Embodiment Etc.

In mode 1 described above, multiplying the variation components ah and bh of the color information a1 and b1 by a predetermined ratio produces the pseudo-texture component of the brightness information. As a result, it is made possible to reflect the variation of the color information in the texture component of the brightness information and to enrich the texture of the output image.

Further, in the expression [17] in mode 2 described above, the variation component is amplitude-modulated on a large scale in the area where the brightness information L1 after smoothing is dark. As a result, it is made possible to emphasize in particular the texture in the dark area in which the texture is inconspicuous and it is possible to obtain an output image abundant in texture. On the other hand, in the expression [17], in the medium bright and bright areas in which noise are conspicuous, the variation component is amplitude-modulated on a small scale. Consequently, it is possible to obtain an output image in which noises are inconspicuous.

In the expression [18] in mode 2 described above, the smaller the absolute values of the color information a1 and b1 after smoothing, the larger on a scale, the variation component is amplitude-modulated. As a result, it is made possible to emphasize the texture in the low saturation area in which the texture is inconspicuous and it is possible to obtain an output image abundant in texture. On the other hand, in the expression [18], in the medium saturation and high saturation areas in which noises are conspicuous, the variation component is amplitude-modulated on a small scale. Consequently, it is possible to obtain an output image in which noises are inconspicuous.

Further, in mode 3 described above, modulating the variation component with a random number makes it possible to frequency-diffuse the frequency component of the variation component. In this case, the texture included in the variation component varies randomly and finely and it is made possible to add to the output image the texture that randomly varies as that of the actual object varies.

As to the noise included in the variation component, modulating with a random number using mode 3 also makes it possible to frequency-diffuse the conspicuous noise (color speckle) in the low spatial frequency band to the high band. As a result, it is made possible to turn the noise into an inconspicuous noise with small particles.

Furthermore, adding the texture component Vh' modulated with a random number makes it possible to add ascertain kind of dither effect. As a result, it is also made possible to raise the gradation of an output image.

In particular, modulating with the 1/f noise makes it possible to modulate unnatural noises biased to a specific spatial frequency into the frequency fluctuation of noise that occurs often in the natural environment. As a result, it is made possible to convert an unnatural, conspicuous noise (color speckle noise) into a more natural (for example, similar to the particles of a film) brightness noise. Furthermore, addition of the natural dither effect makes it possible to bring gradation of an output image closer to a more natural gradation.

In the second embodiment, the variation component of the color information is converted into the texture component of the brightness information and added to the brightness information. Consequently, the color noise does not deteriorate.

Next, another embodiment will be described.

Third Embodiment

A third embodiment describes an electronic camera.

Figure 3:
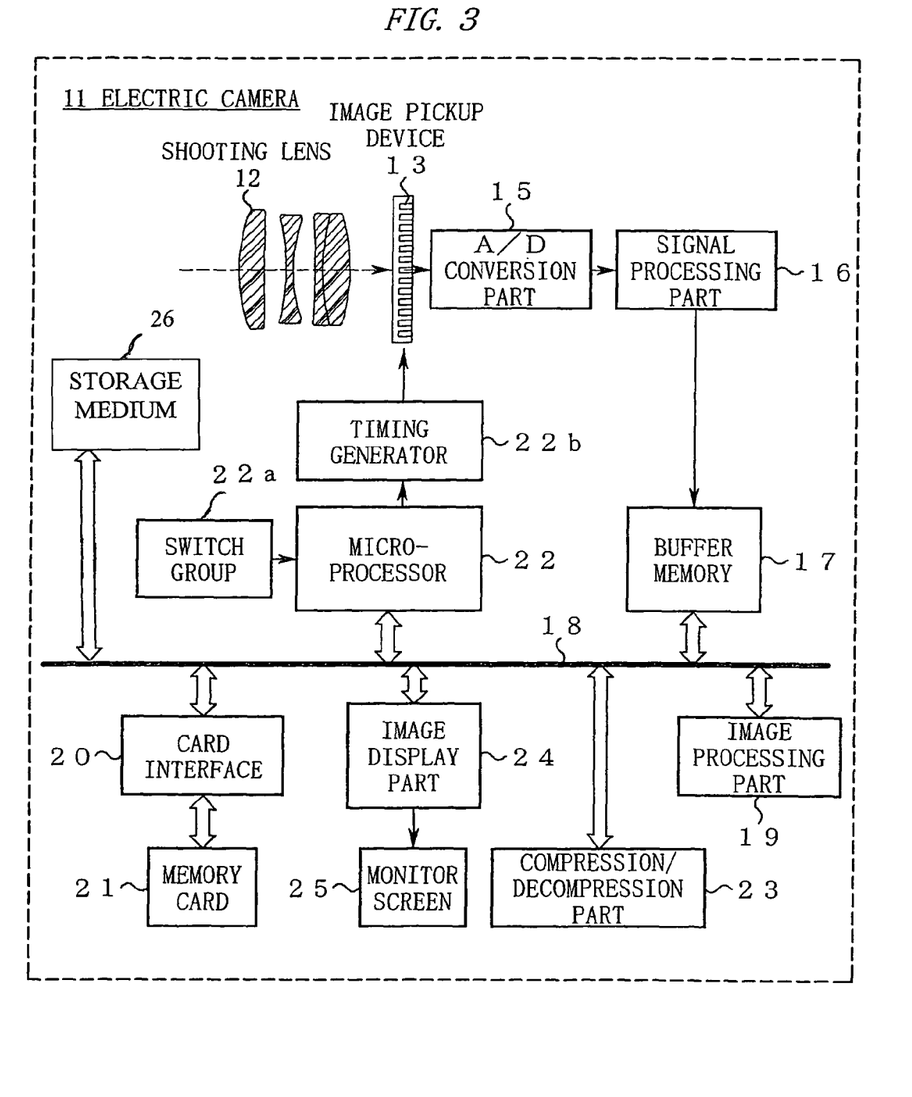
FIG. 3 is a block diagram showing a configuration of an electronic camera.

FIG. 3 is a block diagram showing a configuration of the present embodiment.

In FIG. 3, a shooting lens 12 is mounted on an electronic camera 11. In the image space of the shooting lens 12, an acceptance surface of an image pickup device 13 is arranged. The operation of the image pickup device 13 is controlled by an output pulse of a timing generator 22b.

An image produced by the image pickup device 13 is stored temporarily in a buffer memory 17 via an analog-to-digital conversion part 16 and a signal processing part 16. The buffer memory 17 is connected to a bus 18. To the bus 18, an image processing part 19, a card interface 20, a microprocessor 22, a compression/decompression part 23, an image display part 24, and a storage medium 26 are connected. Among these, the card interface 20 writes and reads data to and from a detachable memory card 21. Further, to the microprocessor 22, a signal of the operation of a user from a switch group 22a of the electronic camera 11 is input. Furthermore, the image display part 24 displays an image on a monitor screen 25 provided on the backside of the electronic camera 11. The storage medium 26 stores an image processing program according to any of the disclosed embodiments for execution by the microprocessor 22.

The electronic camera 11 thus configured executes the texture emphasis in the first to second embodiments by means of the microprocessor 22 and the image processing part 19 (FIG. 1, FIG. 2, etc.).

Such texture emphasis may be performed on the image data during shooting or may be performed later on the image data recorded in the memory card 21.

Supplementary Items of the Embodiments

The above-described embodiments have described the case where a user performs texture emphasis using a computer or an electronic camera. However, the present invention is not limited to this. For example, it may also be possible to realize the present invention by hardware such as an ASIC or the like. Further, for example, it may also be possible to provide as a service the image processing method shown in FIG. 1 and FIG. 2 to the image data transmitted from the user in an image processing server on the Internet.

The above-described embodiments have described the case where texture emphasis is performed in the Lab color space. However, the present invention is not limited to this. For example, it is possible to perform the same texture emphasis in the HSV color space or other color spaces.

In the above-described embodiments, it is preferable to perform limiting processing on the signal level of each component after texture emphasis in order to prevent it from going beyond a determined color area.

The above-described embodiments have described the case where texture emphasis is performed on the entire screen. However, the present invention is not limited to this.

For example, it may also be possible to perform texture emphasis only to a part of the screen (a main object, human being or skin color area, shade part, trimming range, background part except for human being and skin color area, etc.). In this case, it is made possible to effectively emphasize the texture of a specific portion of the screen while avoiding the adverse influence of an increase in noises on the entire screen.

In the above-described embodiments, the texture emphasis of brightness is intensified in the dark part and the low saturation part. However, the present invention is not limited to this. In general, it is preferable to determine the area for brightness and the area of color saturation in which texture is emphasized by taking the adverse influence of an increase in noises into account.

In the above-described embodiments, one kind of smoothing is performed. However, the present invention is not limited to this. For example, it may also be possible to perform the first smoothing (for example, smoothing radius R=8) for smoothing the medium band of the spatial frequency in which the visual sensitivity is high and the second smoothing (for example, smoothing radius R=4) for smoothing the noise band, respectively. In this case, extracting a variation component from the difference between before and after the first smoothing makes it possible to produce a texture component of high quality. Further, adding the texture component obtained from the variation component to the output of the second smoothing processing of low noises makes it possible to obtain an output image abundant in texture but with a faint noise.

The present invention can be implemented in various forms without departing from its sprit or main characteristics. Because of this, the above-described embodiments are only illustrative examples from all the standing points and should not be interpreted limitedly. The scope of the present invention is specified by the scope of claims and not limited by the description of the specification. Further, modifications and alterations belonging to the equivalent scope of claims are all included in the scope of the present invention.

The invention is not limited to the above embodiments and various modifications may be made without departing from the spirit and scope of the invention. Any improvements may be made in part or all of the components.

What is claimed is:

1. An image processing device performing image processing to image data of an image, the image data including brightness information and chroma information, comprising:
   a variation extraction part that extracts a local variation component from the chroma information in said image data;
   a conversion part that produces a pseudo-texture component of brightness from the variation component from said chroma information; and
   an addition part that adds said pseudo-texture component to said brightness information and thereby produces brightness to which said pseudo-texture component is added, wherein:
   said variation extraction part comprises a first smoothing part that smoothes the image with a first smoothing radius;
   a second smoothing part that smoothes the image with a second smoothing radius that is smaller than said first smoothing radius; and
   a difference part that obtains a difference between before and after smoothing by said first smoothing part to produce the variation component; and
   said addition part adds said pseudo-texture component to an output of said second smoothing part.

2. The image processing device according to claim 1, wherein
   the first smoothing part extracts a smoothed component, and
   said conversion part produces said pseudo-texture component by modulating said variation component in accordance with a value of said smoothed component.

3. The image processing device according to claim 1, wherein
   said conversion part produces said pseudo-texture component by multiplying said variation component by a random number value.

4. The image processing device according to claim 1, wherein
   said conversion part produces a pseudo-texture component of said brightness information by modulating the variation component from said chroma information in accordance with said brightness information.

5. An electronic camera comprising:

the image processing device according to claim 1; and an image pickup part that shoots an object to produce image data, wherein said image data produced by said image pickup part is processed in said image processing device.

6. A computer readable non-transitory medium storing an image processing program that processes image data of an image, the image data including brightness information and chroma information, the program including instructions causing a computer to:

extract a local variation component from the chroma information in the image data;

perform a first smoothing of the image with a first smoothing radius;

perform a second smoothing of the image with a second smoothing radius that is smaller than said first smoothing radius;

obtain a difference between before and after said first smoothing to produce the variation component;

produce a pseudo-texture component of brightness from the variation component from said chroma information;

add said pseudo-texture component to said brightness information and thereby produce brightness to which said pseudo-texture component is added; and add said pseudo-texture component to an output of said second smoothing.

7. An image processing method for performing image processing to image data of an image, the image data including brightness information and chroma information, the image processing method being executed by a computer, comprising:

a variation extraction step that extracts a local variation component from the chroma information in said image data;

a first smoothing step of performing a first smoothing of the image with a first smoothing radius;

a second smoothing step of performing a second smoothing of the image with a second smoothing radius that is smaller than said first smoothing radius;

a difference step of obtaining a difference between before and after the first smoothing step to produce the variation component;

a conversion step of producing a pseudo-texture component of brightness from the variation component from said chroma information by the computer; and an addition step of adding said pseudo-texture component to said brightness information and thereby producing brightness to which said pseudo-texture component is added, wherein the addition step adds said pseudo-texture component to an output of said second smoothing step.

* * * * *